(12) United States Patent
Wang

(10) Patent No.: US 7,028,319 B2
(45) Date of Patent: Apr. 11, 2006

(54) TRANSVERSE-ADJUSTMENT DEVICE FOR A SPINDLE MOTOR

(75) Inventor: Chin-Piao Wang, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 251 days.

(21) Appl. No.: 10/746,756

(22) Filed: Dec. 26, 2003

(65) Prior Publication Data

US 2005/0102692 A1    May 12, 2005

(30) Foreign Application Priority Data

Nov. 6, 2003   (TW) .............................. 92210635 U

(51) Int. Cl.
  *G11B 23/00*   (2006.01)
  *G11B 7/00*   (2006.01)
(52) U.S. Cl. ...................... 720/700; 720/695; 720/696
(58) Field of Classification Search ................ 720/695, 720/696, 700, 697
  See application file for complete search history.

(56) References Cited

U.S. PATENT DOCUMENTS

| | | | | |
|---|---|---|---|---|
| 3,673,583 A | * | 6/1972 | Wirth | 360/98.05 |
| 5,796,707 A | * | 8/1998 | Kim | 720/700 |
| 5,867,471 A | * | 2/1999 | Kim et al. | 720/700 |
| 6,014,362 A | * | 1/2000 | Park | 720/700 |
| 6,236,636 B1 | * | 5/2001 | Ogusu | 720/700 |
| 6,388,982 B1 | * | 5/2002 | Ogusu | 720/700 |
| 6,772,428 B1 | * | 8/2004 | Kim et al. | 720/700 |
| 6,792,614 B1 | * | 9/2004 | Matsumura et al. | 720/700 |
| 6,951,026 B1 | * | 9/2005 | Kageyama et al. | 720/697 |

FOREIGN PATENT DOCUMENTS

| | | | |
|---|---|---|---|
| JP | 01279459 A | * | 11/1989 |
| JP | 02141959 A | * | 5/1990 |
| TW | 454925 A1 | | 9/2001 |

* cited by examiner

*Primary Examiner*—William Korzuch
*Assistant Examiner*—Christopher R. Magee
(74) *Attorney, Agent, or Firm*—Han-Yi Lee; Bayshore Patent Group, LLC

(57) ABSTRACT

The transverse-adjustment device for a spindle motor is used to adjust and correct the transverse position of the spindle motor to be aligned at an identical axis with the optical pick-up, and comprises: a first displacement-adjusting member and a second displacement-adjusting member for respectively making transverse length variations of a first adjusting elastic sheet and a second adjusting elastic sheet. The first adjusting elastic sheet and the second adjusting elastic sheet are provided respectively at positions in the transverse direction of the spindle motor, so that the length variations generated in the transverse direction can be used to adjust the transverse position of the spindle motor.

7 Claims, 3 Drawing Sheets

TRANSVERSE-ADJUSTMENT DEVICE FOR A SPINDLE MOTOR

FIELD OF THE INVENTION

The present invention is related to position adjustment for a spindle motor of an optical disk apparatus, and especially to a transverse-adjustment device for the spindle motor of an optical disk apparatus.

BACKGROUND OF THE INVENTION

Conventional measures to adjust to align a spindle motor of an optical disk apparatus with an optical pick-up at an identical axis mostly are: to provide a plurality of positioning holes on a base plate, and then to tightly screw connect the spindle motor to the positioning holes; wherein the positions of the positioning holes have been designed to make the spindle motor of the optical disk apparatus and the optical pick-up be aligned at the identical axis. However, such a conventional measure still has quite a large error; if it is required that alignment shall be done with an extremely minute error and be extremely accurately completed at an identical axis, the conventional measure is unable to do further fine tuning.

A Taiwan patent No. 454,925 titled "Positioning Device for an optical pick-up and a spindle motor of an optical disk apparatus" disclosed the positioning device for positioning the optical pick-up and the spindle motor of the optical disk apparatus; it uses the optical disk apparatus to adjust and correct to make a CD bearing surface of the spindle motor of the optical disk apparatus be on a same reference plane as that of an object lens of the optical pick-up. The positioning device comprises: a guide unit including a first guide member and a second guide member parallel to each other and being both on the same reference plane, and used for supporting the optical pick-up and allowing the latter to slide along the reference plane; and a main-axle base plate including a motor bearing surface for bearing and fixing the spindle motor of the optical disk apparatus and for bearing a bearing portion of the first and the second guide members, the bearing portion surrounding the spindle motor of the optical disk apparatus and being parallel to the CD bearing surface of the spindle motor of the optical disk apparatus. The above state content of the prior art mainly expressed that the CD bearing surface of the spindle motor of the optical disk apparatus is on a same reference plane as that of the object lens of the optical pick-up. However, it did not express any teaching about how to adjust the spindle motor of the optical disk apparatus and the object lens of the optical pick-up to align them at the identical axis.

In view of the above stated defects and deficiency, the inventor of the present invention tried hard to figure out an improvement and thus developed a transverse-adjustment device that can make an optical disk apparatus adjust the transverse position of the spindle motor very conveniently.

SUMMARY OF THE INVENTION

The primary object of the present invention is to provide a transverse-adjustment device for the spindle motor of an optical disk apparatus, it can render the spindle motor of the optical disk apparatus and the optical pick-up to be aligned at an identical axis after adjustment.

To get the above object, the present invention provides a transverse-adjustment device for the spindle motor, it is used to adjust and correct the transverse position of the spindle motor to be aligned at the identical axis with the optical pick-up, and comprises: a first displacement-adjusting member and a second displacement-adjusting member for respectively making transverse length variations of a first adjusting elastic sheet and a second adjusting elastic sheet. The first adjusting elastic sheet and the second adjusting elastic sheet are provided respectively at positions in the transverse direction of the spindle motor, so that the length variations generated in the transverse direction can be used to adjust the transverse position of the spindle motor.

The present invention will be apparent in its objects, feature as well as effects after reading the detailed description of the preferred embodiment thereof in reference to the accompanying drawings.

DETAILED DESCRIPTION OF THE INVENTION

Figure 1:
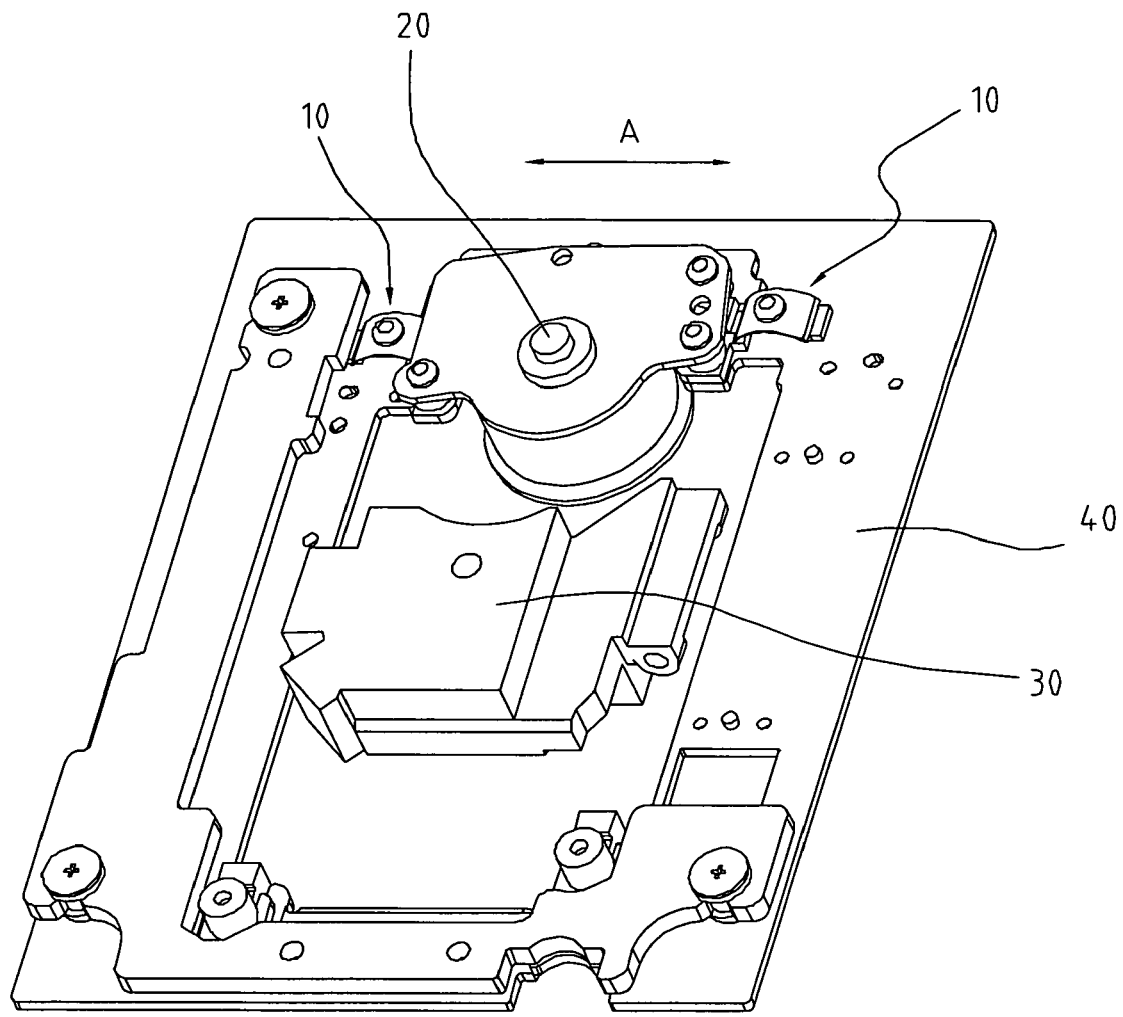
FIG. 1 is a perspective view of the transverse-adjustment device of the present invention.
Figure 2:
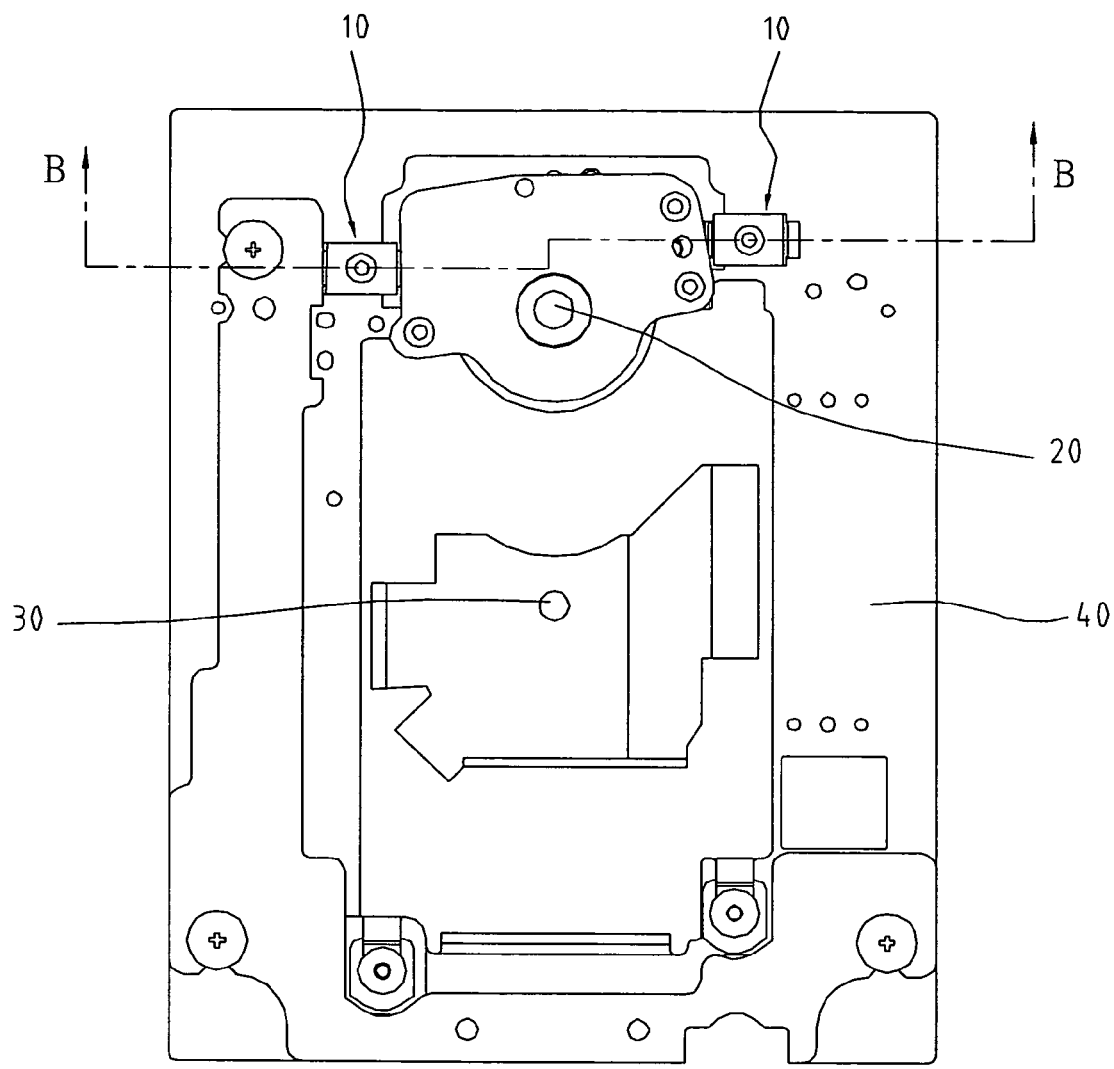
FIG. 2 is a top view of the transverse-adjustment device of the present invention.

FIG. 1 shows a perspective view of a transverse-adjustment device 10 of the present invention, while FIG. 2 shows a top view of the transverse-adjustment device 10 of the present invention. Wherein the transverse-adjustment device 10 mainly performs adjustment of a spindle motor 20 in a transverse direction to render the spindle motor 20 and the object lens (not shown) of an optical pick-up 30 to be aligned at an identical axis after adjustment.

Figure 3:
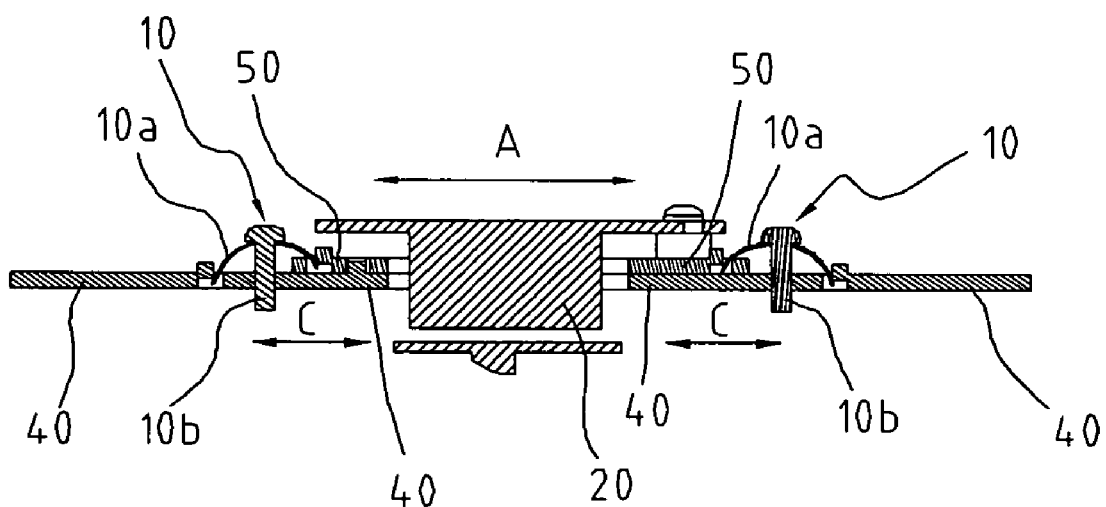
FIG. 3 is a sectional view taken from a sectional line B—B in FIG. 2 of the present invention.

FIG. 3 shows a sectional view taken from a sectional line B—B in FIG. 2 of the present invention. Wherein the transverse-adjustment device 10 comprises: a first and a second displacement-adjusting member 10b as well as a first and a second adjusting elastic sheet 10a. The main function of the first and second displacement-adjusting members 10b is to make generation of transverse length variations C of the first and second adjusting elastic sheets 10a in a transverse direction A. The first and second adjusting elastic sheets 10a are respectively at positions in the transverse direction A of the spindle motor 20, so that the length variations C generated in the transverse direction A can be used to adjust the transverse position of the spindle motor 20.

The first and second displacement-adjusting members 10b of the present invention can be screws in practicing, and the first and second adjusting elastic sheets 10a can be made from curved metal sheets. Now the preferred mode of practicing of the transverse-adjustment device 10 of the present invention is described: one end of each of the first and second adjusting elastic sheets 10a can be abutted on a base plate 40 respectively, while the other end can be abutted on a motor base-plate 50, the function of the motor base-plate 50 mainly is to bear and fixedly hold the spindle motor 20. Speaking structurally, the motor base-plate 50 and the spindle motor 20 can be deemed integral. With the above stated screws, for an example, a screwdriver can be used to rotate the screws to make length variations C of the curved metal sheets, by virtue that the ends of the curved metal sheets abutting on the base plate 40 are fixed, the length variations C of the curved metal sheets will influence the other ends abutting on a motor base-plate 50. By the fact that the curved metal sheets generate elongating length variations C by down pressing of the screws, the elastic force created by the curved metal sheets accordingly will move the transverse positions of the motor base-plate 50 in the transverse direction A, i.e., they change the original positions of the spindle motor 20 in the transverse direction A.

The transverse-adjustment device 10 of the present invention is very convenient in operation; in the above stated preferring embodiment, it needs only to use a screwdriver as a tool for adjustment. The present invention can largely lower the purchasing expenditure of kits for adjustment.

The present invention uses screws as the first and second displacement-adjusting members 10b in practicing, the screws can not only render the first and second adjusting elastic sheets 10a to respectively generate transverse length variations C, but also have a fixing function for the motor base-plate 50 to thereby reduce the amount of screws required for fixing.

It will be apparent to those skilled in this art that various modifications or changes can be made to the present device without departing from the spirit and concept of this invention. Accordingly, all such modifications and changes also fall within the scope and concept of the appended claims and are intended to form part of this invention.

What is claimed is:

1. A transverse-adjustment device for a spindle motor used on an optical disk apparatus for adjustment and correction of transverse position of said spindle motor to align said spindle motor with an optical pick-up at an identical axis, said transverse-adjustment device comprises:
    a first displacement-adjusting member and a second displacement-adjusting member for respectively making transverse length variations of a first adjusting elastic sheet and a second adjusting elastic sheet;
    said first adjusting elastic sheet and said second adjusting elastic sheet are provided respectively at positions in a transverse direction of said spindle motor, so that said length variations generated in said transverse direction is used to adjust said transverse position of said spindle motor.

2. The transverse-adjustment device as in claim 1, wherein each of said first and second displacement-adjusting members is a screw.

3. The transverse-adjustment device as in claim 2, wherein said screws connect respectively with said first and second adjusting elastic sheets, said first and second adjusting elastic sheets generate said length variations by rotation of said screws.

4. The transverse-adjustment device as in claim 1, wherein said first and second adjusting elastic sheets are in curved shapes.

5. The transverse-adjustment device as in claim 1, wherein said first and second adjusting elastic sheets are metal sheets.

6. The transverse-adjustment device as in claim 1, wherein said first and second adjusting elastic sheets each has an end abutting on a base plate.

7. The transverse-adjustment device as in claim 1, wherein said first and second adjusting elastic sheets each has another end abutting on a motor base-plate.

* * * * *